(12) United States Patent
Nayebi et al.

(10) Patent No.: US 6,191,643 B1
(45) Date of Patent: Feb. 20, 2001

(54) VOLTAGE BOOST CIRCUITRY FOR HARD DRIVE WRITE PREAMPLIFIERS

(75) Inventors: Mehrdad Nayebi, Palo Alto; Murat Hayri Eskiyerli, San Jose; Phil Shapiro, Palo Alto, all of CA (US)

(73) Assignees: Sony Corporation, Tokyo (JP); Sony Electronics Inc., Park Ridge, NJ (US)

( * ) Notice: Under 35 U.S.C. 154(b), the term of this patent shall be extended for 0 days.

(21) Appl. No.: 09/282,796

(22) Filed: Mar. 31, 1999

(51) Int. Cl.[7] ........................................... G06F 11/16
(52) U.S. Cl. ................................................. 327/536
(58) Field of Search ................................... 327/390, 536, 327/530, 534, 535

(56) References Cited

U.S. PATENT DOCUMENTS

| | | | |
|---|---|---|---|
| 5,581,455 | * 12/1996 | Rossi et al. | 363/60 |
| 5,604,671 | * 2/1997 | Okamura | 363/60 |
| 5,689,208 | * 11/1997 | Nadd | 327/390 |
| 5,812,015 | * 9/1998 | Tobita | 327/534 |
| 6,060,948 | * 5/2000 | Tarantola et al. | 327/589 |

* cited by examiner

*Primary Examiner*—Jeffrey Zweizig
(74) *Attorney, Agent, or Firm*—Mayer, Fortkort & Williams, LLC; Karen L. Williams, Esq

(57) ABSTRACT

Higher write speeds in hard disk write preamplifiers require higher supply voltages. The voltage across an inductive write head, $V_L$, is proportional to the value of inductance, L, and to the speed at which the write current is reversed, di/dt. Accordingly, the write current reversal time in inductive write-heads fundamentally depends on how large a voltage can be impressed across the write drive head. The proposed circuitry and method provides a voltage boost circuit for hard disk drive preamplifiers that satisfies the demand for improved rise-time while meeting the conflicting demand for maintaining a same supply voltage.

4 Claims, 4 Drawing Sheets

VOLTAGE BOOST CIRCUITRY FOR HARD DRIVE WRITE PREAMPLIFIERS

CROSS-REFERENCE TO RELATED APPLICATIONS

The present invention is related to an invention that is the subject matter of a commonly-assigned co-pending application entitled "Architecture for Hard Disk Drive Write Preamplifiers", filed concurrently herewith, which is incorporated by reference herein and is also related to an invention that is the subject matter of a commonly-assigned co-pending application entitled "Fast High Side Switch for Hard Disk Drive Preamplifiers", also filed concurrently herewith, also incorporated by reference herein.

FIELD OF THE INVENTION

The present invention relates generally to the field of preamplifiers within magnetic storage systems and, more particularly, to voltage boost circuitry for preamplifiers within magnetic storage systems.

BACKGROUND OF THE INVENTION

Rotating magnetic disk data storage devices are known in the art. In these devices, one or more read/write heads, typically inductive heads, are used to store data and read data from an associated disk media surface. More specifically, a read/write head is passed over a magnetic medium and transduces the magnetic transitions into pulses of an analog signal that alternates in polarity.

The signals to and from a head-disk assembly of a hard disk drive are then processed mainly by a preamplifier (write driver), i.e., the preamplifier receives from an associated channel device both data signals to be written onto a disk surface during a write operation and control signals used to specify the individual head to be selected for a read or write operation.

Write speeds in hard disk drive preamplifiers are continually improving. An inductive write head includes an inductive coil that can change the localized magnetic fields on the magnetic data-storage medium and thus allows the digital data to be recorded. The speed of this recording process (i.e., the write speed) is determined by how fast the current in a hard disk drive write head can be reversed (the polarity of the write current through the write head being reversed in response to the bit pattern of the information signal). This is also referred to as the "rise-time." Typically the desired requirements for the write driver are a large current capability (e.g., 40–80 ma) combined with a fast rise time (e.g., 1–4 ns) for driving the inductive write head.

The write head for a disk data storage device can be approximately modeled by an inductor with an inductance of L. The voltage across an inductor is ideally proportional to the rate of change of the current through the inductor in time. The mathematical expression for this voltage is given as $V_L = L\, di/dt$. Essentially, the voltage across the inductive write head, $V_L$, is proportional to the value of inductance, L, and to the speed at which the write current is reversed, $di/dt$. This means that the write current reversal time in inductive write-heads fundamentally depends on how large a voltage can be impressed across the write drive head. Normally, the voltage across the inductor is limited by the supply voltages. Thus, either the head inductance value should be decreased, or, the supply voltage should be increased, to improve the write speed. The first option, decreasing the head inductance value, is normally not preferred, as it negatively affects the reliability of the data-recording process.

Conventional techniques use the power supply to generate the voltage across the inductor. However, the voltage supply limits the voltage that can be applied across the inductor and therefore limits the rise time. Higher write speeds require higher supply voltages. However, the second alternative, increasing the supply voltage, may not always be possible, as system-wide considerations dictate the selection of power supply voltages, and the present trend in fact is the reduction of power supply voltages.

The present invention is therefore directed to the problem of developing a hard disk drive preamplifier that satisfies the demand for improved rise-time while meeting the conflicting demand for maintaining a same supply voltage.

SUMMARY OF THE INVENTION

The present invention solves these problems by providing a novel method and architecture for improving the rise-time in a preamplifier so as to provide faster write speeds in disk data storage devices. In particular, a very high speed charge pump, with enough charge stored, is provided to supply current to the inductive write head.

The present invention provides a preamplifier/write driver (also known in the art as simply a preamplifier), for use with a disk drive assembly, incorporating voltage boost circuitry within the preamplifier, to provide a reduced rise time and therefore a faster write speed.

In one embodiment of the present invention, a boost circuit, for a preamplifier having a mode of operation for providing a boost voltage to reverse the current in an inductive write head, includes a first switch having a first terminal and a second terminal, the second terminal coupled to ground, a first npn transistor, a capacitive element coupled between the emitter of the npn transistor and the first terminal of the first switch and a second switch having a first terminal coupled to a supply voltage and second terminal coupled to the first side of the first switch. The capacitor is charged to a voltage equal to the supply voltage minus the voltage drop across the npn transistor by closing the first switch and opening the second switch. A boost voltage to reverse the current in the inductive write head is then generated by opening the first switch and closing the second switch.

In one particular embodiment, the first switch is driven by an emitter-coupled pair of transistors and in yet a further embodiment, the collector terminal of the first switch is clamped by an npn transistor thereby preventing the transistor from entering the deep saturation region of operation.

In a second embodiment of the invention, a voltage boost circuit for increasing a preamplifier current, includes a charge storage device for storing a charge, a timing controller coupled to the charge storage device, a voltage source coupled to the charge storage device and to the timing controller, the voltage source charging the charge storage device under the control of the timing controller, and an adder coupled to the charge storage device, to the timing controller and to the voltage source, the adder summing the voltage stored in the charge storage device and the voltage source under the control of the timing controller.

From a method standpoint, the invention includes a method of intermittently increasing an internal nodal voltage in a preamplifier of a disk data storage device, the method comprising the steps of charging a capacitor by closing a first switch and opening a second switch, the first switch having a first side connected to the low voltage side of the capacitor and a second side connected to ground, and the second switch having a first side connected to a supply voltage and a second side connected to the first side of the first switch, and, opening the first switch and closing the second switch, the low voltage side of the capacitor being driven high and the high voltage side of the capacitor going above the supply voltage, thereby supplying the current needed to reverse the current in the inductor.

In a particular embodiment of the invention, the first switch is an npn transistor and during the charging step, the base of the first switch is pulled high.

The features of the invention believed to be novel are set forth with particularity in the appended claims. The invention itself however may be best understood by reference to the following detailed description taken in conjunction with the accompanying drawings.

DETAILED DESCRIPTION

Figure 1:
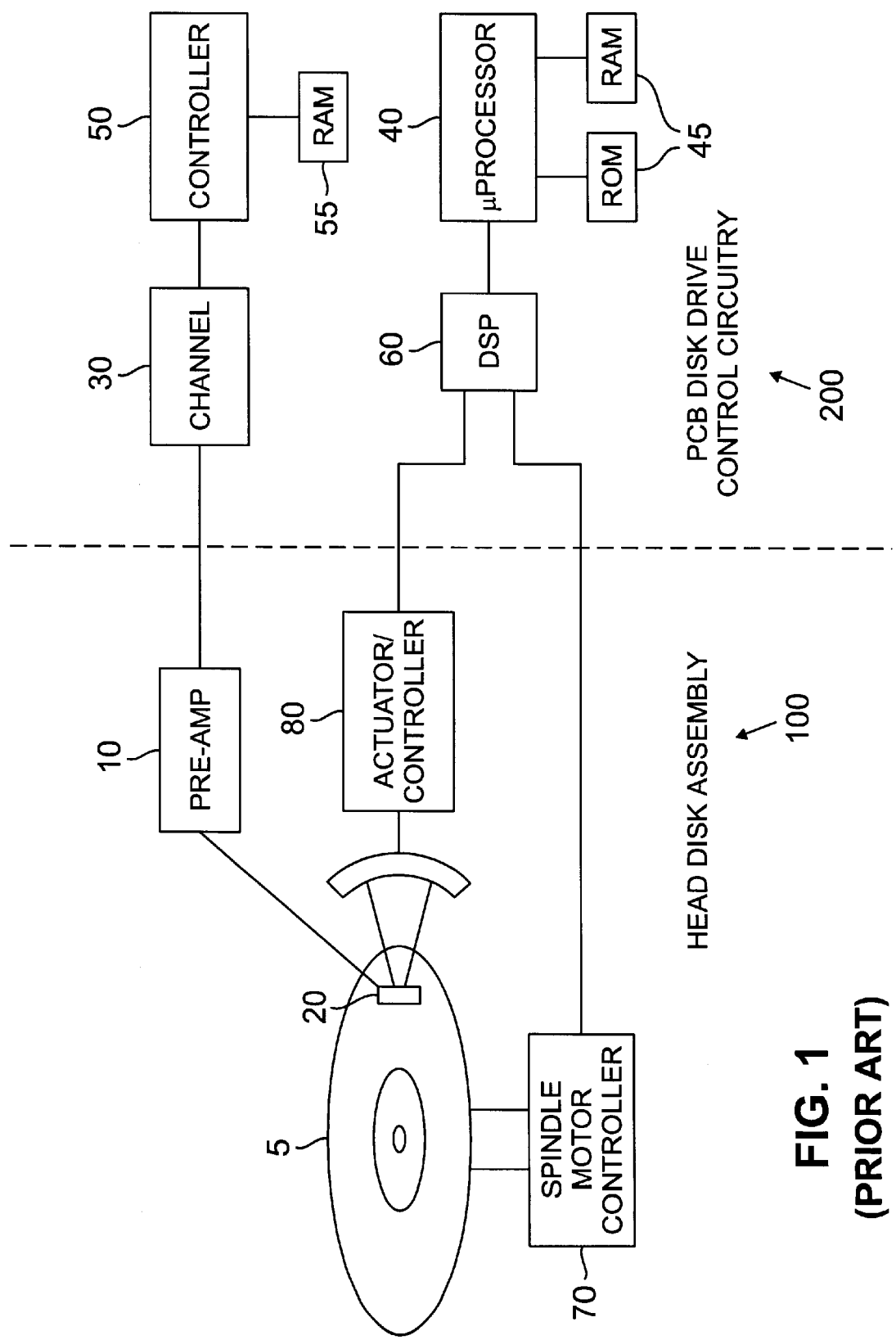
FIG. 1 a block diagram of a conventional rotating magnetic disk drive storage system.

The following description of the block diagram of FIG. 1, illustrating a conventional magnetic disk data storage system, is not critical to the invention, but rather is provided as background material. In particular, as shown in FIG. 1, head disk assembly 100 includes rotatable data storage disks 5 on which data is stored in a plurality of tracks. The rotatable data storage disks 5 are rotated by spindle motor/controller 70.

Read/write preamplifier circuit 10, receives from an associated channel both data signals to be written onto a disk 5 surface during a write operation and control signals to specify the individual head to be selected for both read or write operations. The preamplifier circuit 10 is typically positioned between the read/write head disk assembly 20 and the data channel 30. Read/write head disk assembly 20 includes magnetic transducers which employ write current to an inductive portion of the head when writing data to a disk and bias current or voltage to a resistive portion of the head when reading data from a disk.

The microprocessor 40 and the controller 50, together with memory 45 and 55, respectively, provide overall control and also interface to the outside world. The digital signal processor 60 allows the microprocessor to speed up calculation of the servo information. The spindle motor/controller 70 and the actuator assembly/controller 80 handle the main components of the mechanical subsystem.

Figure 2:
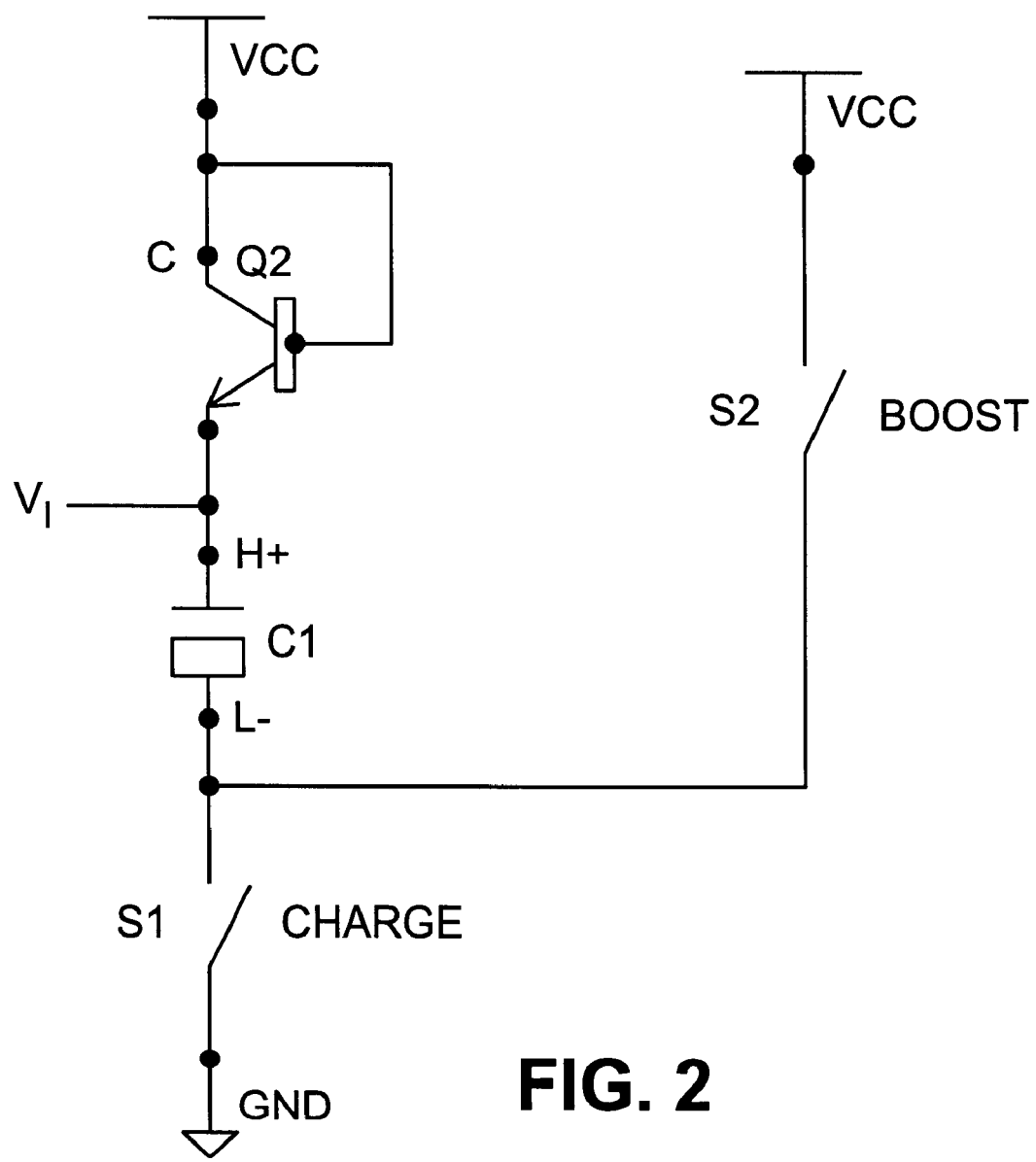
FIG. 2 depicts a simplified diagram of a boost circuit illustrating the principles of the preset embodiment.

FIG. 2 illustrates a simplified diagram of a preferred embodiment of the proposed boost circuit, which is incorporated into preamplifier 10. Instead of relying on modifying the power supply to provide additional current to improve the rise-time, a higher voltage is generated to supply the necessary current. This is called the "boost voltage." As shown in the simplified circuit of FIG. 2, one terminal of a capacitor C1 is coupled to the emitter of an npn transistor Q2 and a second terminal of capacitor C1 is coupled to one terminal of a "CHARGE" switch S1. The other terminal, the second terminal, of the "CHARGE" switch S1 is coupled to ground. A first terminal of a second switch S2, a "BOOST" switch, is coupled to a supply voltage $V_{CC}$ and a second terminal of the second switch is coupled to the second terminal of capacitor C1. The collector of npn transistor Q2 is coupled to supply voltage $V_{CC}$ and also to the base of transistor Q2.

There are two stages to the operation of the proposed boost circuitry. First, the boost capacitor C1 must be charged. This is accomplished by closing the CHARGE switch S1 and opening the BOOST switch S2. It will be appreciated by those skilled in the art that this stage serves to charge the boost capacitor C1 to a voltage equal to supply voltage $V_{CC}$ minus the voltage drop across transistor Q2, $V_{be}$ (i.e., $V_{CC}-V_{be}$).

In the second phase of the boost process, the CHARGE switch S1 is opened and the BOOST switch S2 is closed. This causes the low voltage side of the capacitor (i.e., the second terminal) to be driven high. The high side voltage side of the capacitor (i.e., the first terminal) goes above the power supply. The base-emitter junction of transistor Q2 is thus turned off, isolating the first terminal of capacitor C1 from power supply $V_{CC}$. A terminal at the emitter of transistor Q2 is then coupled to the write head and supplies the current needed to reverse the current in the inductor.

Figure 3:
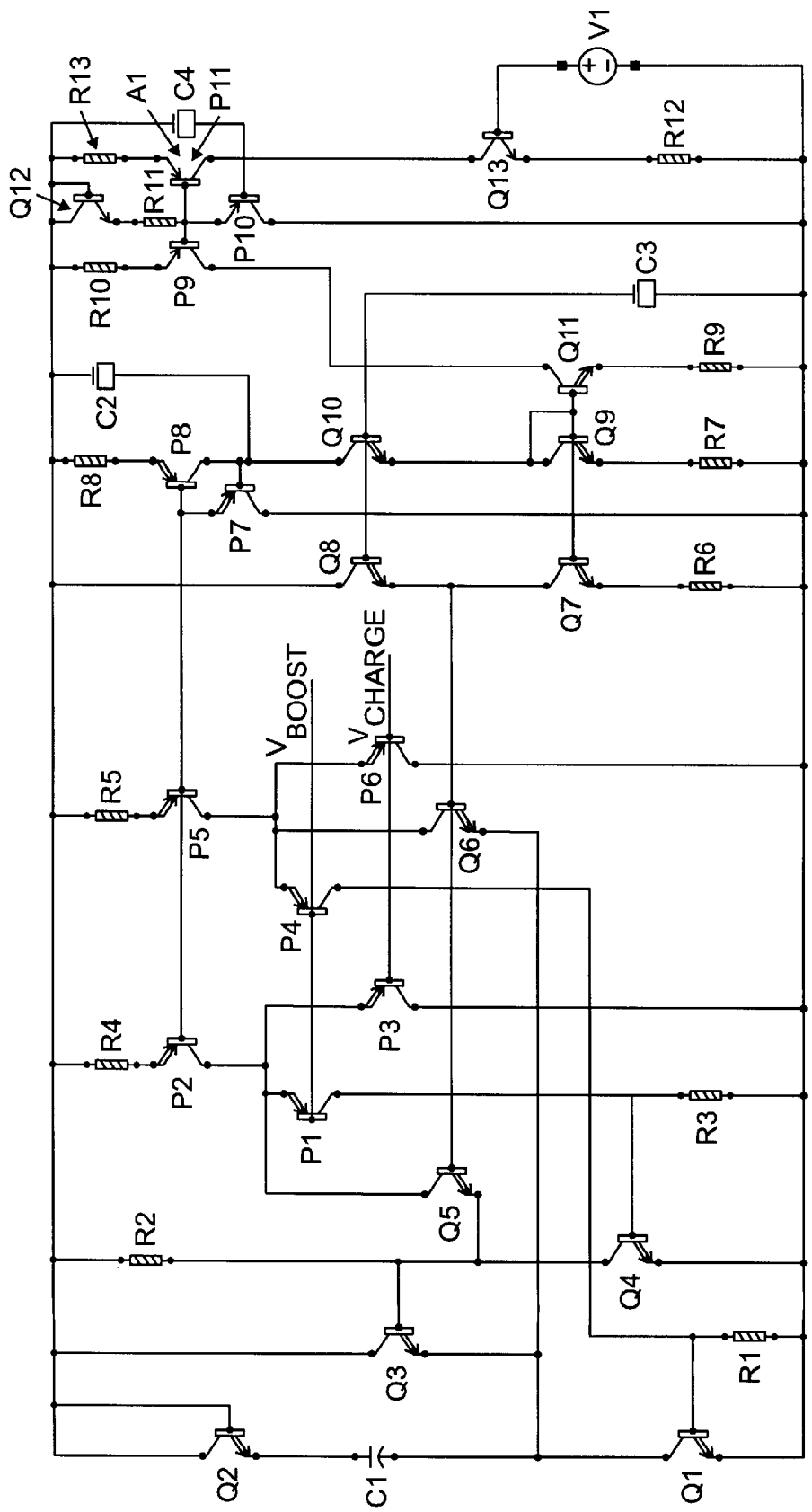
FIG. 3 depicts a detailed schematic diagram of one proposed embodiment of a boost circuit incorporating the principles of the present invention.

FIG. 3 shows a more detailed schematic of an embodiment incorporating the proposed boost circuit. As shown in FIG. 3, the "CHARGE" switch, transistor Q1, is driven by the emitter-coupled pair formed by transistors P4 and P6. When "$V_{CHARGE}$" (at the base of transistors P3 and P6) goes higher than "$V_{BOOST}$" (at the base of transistors P1 and P4), the emitter current of transistor P4 pulls the base of transistor Q1 high. Thus, Q1 is saturated, which pulls the negative terminal of capacitor C1 to near ground. As a result, C1 is charged to $V_{CC}-V_{be}-V_{ce,sat}$. The charging duration of capacitor C1 is determined by the value of the capacitor and the conductance seen at the emitter of transistor Q2. The charging current is inversely proportional to the emitter conductance at any one instant, which is an exponential function base-emitter voltage of transistor Q2. Thus, the initial charging current for capacitor C1 is very high.

Transistor Q1 is prevented from entering the deep-saturation region of operation by clamping its collector terminal by emitter of transistor Q6 (note that the collector of transistor Q6 is connected to the emitters of the P4-P6 emitter-coupled pair and therefore steals from the collector current of P4, which is limited by collector current of transistor P2). Thus, there is a feedback loop consisting of transistor P4, resistor R1 and transistor Q1 on the forward gain path and transistor Q6 on feedback gain path.

Transistor Q3 is pulled down by transistor Q4, which is turned on by the collector current of P1. Transistor Q4 is prevented from being saturated by clamp transistor Q5. There is a feedback loop for transistor Q5 that is similar to that for transistor Q6, which includes transistor P1, resistor R5 and transistor Q4 on the forward-gain path, and transistor Q6 on feedback gain path. When the transistor Q4 collector node voltage goes low enough to turn on transistor Q5, then the feedback loop limits the emitter current of transistor Q5.

In the second phase of operation, when the $V_{BOOST}$ input goes higher than the $V_{CHARGE}$ input, the circuit is in "Boost" phase. As a result, the base currents of transistors Q1 and Q4 are turned off. At the same time, resistors R1 and R3 pull charge out of the bases of transistors Q1 and Q4, respectively, which turns off these transistors faster. The base voltage of transistor Q3 is increased to supply voltage $V_{CC}$. This pulls the bottom of the boost capacitor to within one diode drop of $V_{CC}$, i.e., $V_{CC}-V_{be}$.

The switching of the elements in the circuit is made insensitive to process and temperature variations by referring all voltage levels to a reference voltage indicated in FIG. 3 by $V_1$. Therefore Q13 emitter current is equal to $(V_{CC}-V_{be,Q13})/R12$. This reference current is then mirrored three times to supply P1 and P4 collector currents. These current values are multiplied by R3 and R1, respectively, which are some type of resistance having process and temperature variations very close to R12, respectively, to obtain base-emitter voltages of Q4 and Q1, respectively.

Figure 4:
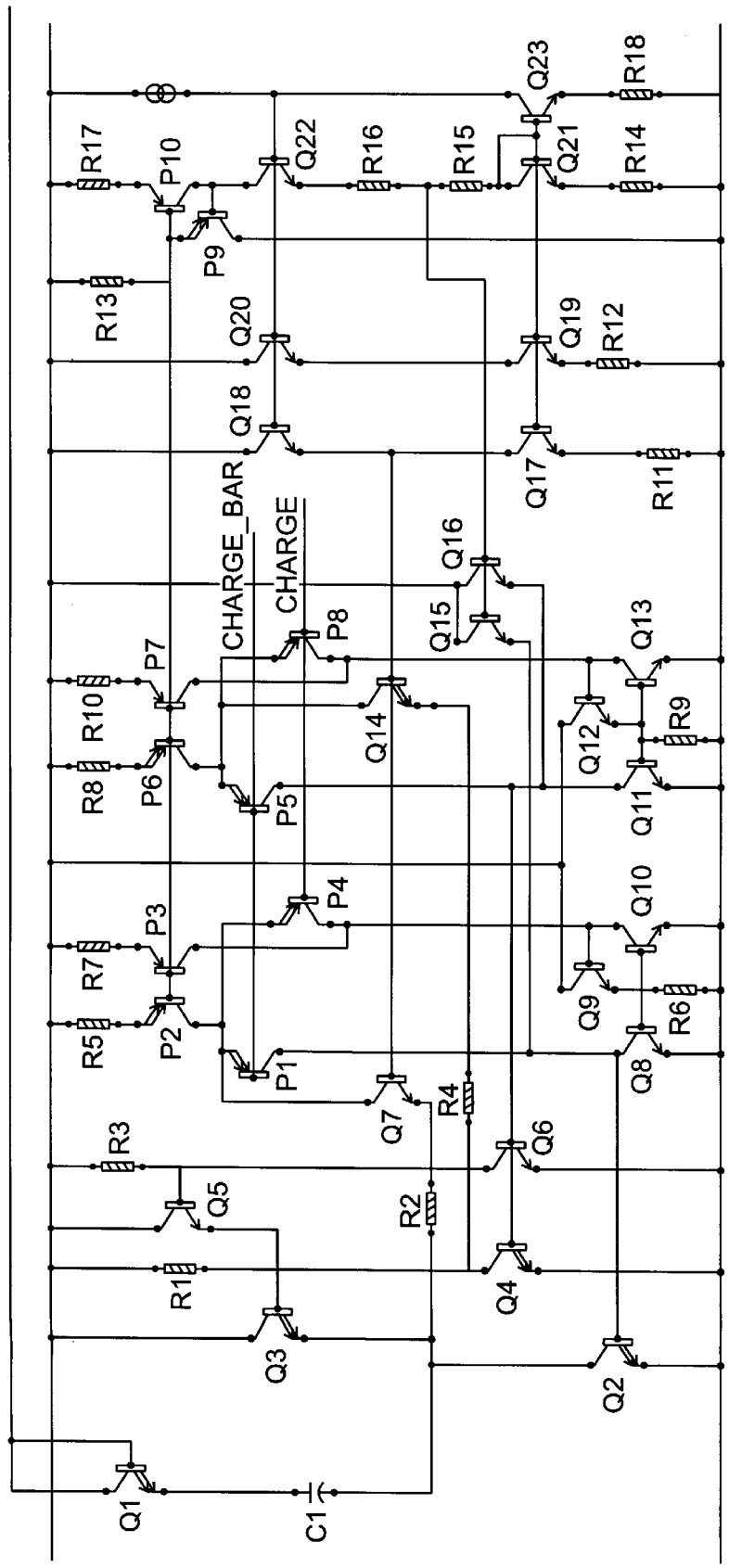
FIG. 4 depicts a detailed schematic diagram of an alternative embodiment of a boost circuit incorporating the principles of the present invention.

Another embodiment of the charge pump circuit is shown in FIG. 4. The main difference between the circuits in FIGS. 3 and 4 is the switching method for charge-switch and boost-switch transistors. Instead of passive switching of the bases of charge- and boost-switch transistors (Q1 and Q4 in FIG. 3, respectively), an active switching scheme consisting of a current-mirror (i.e., transistor Q8-Q10 and Q11-Q13 pairs in FIG. 4) is utilized. Transistors Q15 and Q16 are used to clamp the collector voltages of transistors Q8 and Q11 to prevent them from collapsing into the deep-saturation region of operation when "charge" signal is high. It also includes a clamp circuit (Q5, Q6 and R3) to supply additional base current to transistor Q3 during "charge_bar" phase, as current gain β of Q3 drops due to high-level injection effects at its base.

The present invention has been described in terms of specific embodiments incorporating details to facilitate the understanding of the principles of operation of the invention. Such reference herein to specific embodiments and details thereof is not intended to limit the scope of the claims appended hereto. For example, while the preferred embodiment of the present invention has been illustrated and described using bipolar transistors, it will be appreciated by those skilled in the art that the circuit of the present invention may be implemented using another device technology, including but not limited to CMOS, MOS, discrete components and ECL. In addition, different circuit configurations could also be substituted to perform the same functions of the preferred embodiment. Various modifications may be made in the embodiments chosen for illustration without departing from the spirit and scope of the invention.

What is claimed is:

1. A boost circuit, for a preamplifier having a mode of operation for providing a boost voltage to reverse the current in an inductive write head, the boost circuit comprising:

a first switch having a first terminal and a second terminal, the second terminal coupled to ground;

a first npn transistor having an emitter, a collector and a base;

a capacitive element coupled between the emitter of said npn transistor and the first terminal of said first switch; and a second switch having a first terminal coupled to a supply voltage and a second terminal coupled to the first terminal of said first switch, wherein said first switch is an npn transistor, and further wherein said first switch is driven by an emitter-coupled pair of transistors.

2. The boost circuit as claimed in claim 1, wherein the collector terminal of said first switch is clamped by an npn transistor thereby preventing the transistor from entering the deep saturation region of operation.

3. In a data storage system having a plurality of magnetic transducers which read and write data to and from a magnetic medium, wherein the magnetic transducer write heads are inductive in operation, a write driver/preamplifier boost circuit comprising:

a first switch having a first terminal and a second terminal, the second terminal coupled to ground;

a first npn transistor having an emitter, a collector and a base;

a capacitive element coupled between the emitter of said npn transistor and the first terminal of said first switch; and a second switch having a first terminal coupled to a supply voltage (Vcc) and a second terminal coupled to the first terminal of said first switch, wherein said first switch is an npn transistor, and further wherein said first switch is driven by an emitter-coupled pair of transistors.

4. The boost circuit as claimed in claim 3, wherein the collector terminal of said first switch is clamped by an npn transistor thereby preventing the transistor from entering the deep saturation region of operation.

* * * * *